US007592886B2

(12) United States Patent
Saito et al.

(10) Patent No.: US 7,592,886 B2

(45) Date of Patent: Sep. 22, 2009

(54) DIELECTRIC PORCELAIN COMPOSITION AND HIGH FREQUENCY DEVICE USING THE SAME

(75) Inventors: Ryuichi Saito, Osaka (JP); Hiroshi Kagata, Osaka (JP); Hidenori Katsumura, Hyogo (JP); Muneyuki Sawada, Osaka (JP)

(73) Assignee: Panasonic Corporation, Osaka (JP)

( * ) Notice: Subject to any disclaimer, the term of this patent is extended or adjusted under 35 U.S.C. 154(b) by 221 days.

(21) Appl. No.: 11/814,946

(22) PCT Filed: Mar. 22, 2006

(86) PCT No.: PCT/JP2006/305682

§ 371 (c)(1), (2), (4) Date: Jul. 27, 2007

(87) PCT Pub. No.: WO2006/109465

PCT Pub. Date: Oct. 19, 2006

(65) Prior Publication Data

US 2009/0033441 A1 Feb. 5, 2009

(30) Foreign Application Priority Data

Mar. 31, 2005 (JP) ............................. 2005-102170
Oct. 31, 2005 (JP) ............................. 2005-316111

(51) Int. Cl.
*C04B 35/00* (2006.01)
*H01P 7/00* (2006.01)

(52) U.S. Cl. ....................................... 333/219; 501/139

(58) Field of Classification Search ................. 333/219, 333/219.1, 165–167, 175, 185; 361/301.1, 361/306.3, 307, 308.1, 311–313; 501/139
See application file for complete search history.

(56) References Cited

U.S. PATENT DOCUMENTS 5,273,944 A 12/1993 Kagata et al.
2006/0025298 A1* 2/2006 Emlemdi ..................... 501/26

FOREIGN PATENT DOCUMENTS

| | | | |
|---|---|---|---|
| DE | 10 2004 010 163 | A1 | 9/2004 |
| JP | 8-167324 | A | 6/1996 |
| JP | 9-12361 | A | 1/1997 |
| JP | 2000-007429 | A | 1/2000 |
| JP | 2000-264722 | A | 9/2000 |
| JP | 2000-313660 | A | 11/2000 |
| JP | 2002-326867 | A | 11/2002 |
| JP | 2003-146744 | A | 5/2003 |

OTHER PUBLICATIONS

Supplemental European Search Report for EP 06 72 9649, dated Jun. 9, 2008.
International Search Report for Application No. PCT/JP2006/305682, dated Apr. 25, 2006.

* cited by examiner

*Primary Examiner*—Benny Lee
*Assistant Examiner*—Gerald Stevens
(74) *Attorney, Agent, or Firm*—RatnerPrestia

(57) ABSTRACT

A dielectric porcelain composition of the present invention includes a first component and second component. If the first component is represented by the general formula of $xBaO\text{-}yNd_2O_3\text{-}zTiO_2\text{-}wBi_2O_3$ (provided that x+y+z+w=100), x, y, z, and w satisfy $12 \leqq x \leqq 16$, $12 \leqq y \leqq 16$, $65 \leqq z \leqq 69$, and $2 \leqq w \leqq 5$, respectively. The second component includes 30 to 37 wt % of BaO, 33 to 46 wt % of $SiO_2$, 8 to 12 wt % of $La_2O_3$, 3 to 7 wt % of $Al_2O_3$, 0 to 1 wt % of SrO, 0 to 10 wt % of $Li_2O$, 0 to 20 wt % of ZnO, and 7 wt % or less of $B_2O_3$. The compounding ratio of the second component is between 10 wt % and 30 wt % when the sum of the first and second components is 100. In addition, 0.1 to 1 parts by weight of $Li_2O$ and 3 to 10 parts by weight of ZnO, relative to 100 parts by weight of the sum of the first and second components, is also contained as a third component. An average particle diameter of the dielectric mixed powder forming dielectric porcelain composition before firing is 0.9 μm or less.

11 Claims, 2 Drawing Sheets

DIELECTRIC PORCELAIN COMPOSITION AND HIGH FREQUENCY DEVICE USING THE SAME

This Application is a U.S. National Phase Application of PCT International Application PCT/JP2006/305682.

TECHNICAL FIELD

The present invention relates to dielectric porcelain compositions and high frequency devices using the same.

BACKGROUND ART

There is growing demand for equipment to be downsized in line with the development of mobile phones and wireless LAN communications that employ the microwave bands in the electromagnetic spectrum. To downsize terminal equipment, it is necessary to downsize the high frequency devices it employs, such as high frequency filters and resonators.

These high frequency devices are configured with a capacitor and an internal electrode forming a strip line disposed as required in an inner layer of a laminated body composed of dielectric porcelain. The size of a high frequency device using the same resonance mode is in inverse proportion to the square root of the relative permittivity (∈r) of the dielectric material employed. Accordingly, to manufacture a small resonance device, a material with a relatively high relative permittivity is needed. However, the relative permittivity needed varies according to the frequency band used. With equipment adopting ever higher frequencies, though, the demand for high relative permittivity materials is reducing.

Another characteristic required for the dielectric material used for dielectric porcelain is low loss in the high frequency range. In other words, a high Q value or low frequency-temperature characteristic (TCF) is needed. The Q value is inversely related to dielectric loss (tan δ).

On the other hand, attempts are being made to downsize high frequency devices with high performance by adopting a laminated structure of conductor and dielectric porcelain composition. When a conductor is used in a high frequency range, such as the microwave bands, high conductivity is required. Accordingly, Ag, Cu, or their alloys are typically used as an internal electrode. To achieve the laminated structure of conductor and dielectric porcelain composition as described above, it is necessary to simultaneously fire the internal electrode and dielectric porcelain composition. A material which can be densely sintered under firing conditions that avoid dissolution and oxidization of a conductive metal forming the internal electrode is thus needed. More specifically, the dielectric porcelain composition needs to be sintered at a temperature lower than the melting point of the conductive metal used. If Ag is used, the material needs to be sintered at a temperature lower than the melting point of Ag (961° C.). U.S. Pat. No. 5,273,944 proposes a material of the $Bi_2O_3$—CaO—$Nb_2O_5$ as one example of this type of microwave dielectric porcelain.

However, although conventional $Bi_2O_3$—CaO—$Nb_2O_5$ porcelain can be sintered at a low temperature of 900° C., allowing firing together with Ag, its mechanical strength is relatively low, which is 140 MPa. Accordingly, when a laminated element is formed, a drop impact test reveals, in particular, that cracking is likely to occur from the terminal electrodes of the laminated element mounted on a printed circuit board.

SUMMARY OF THE INVENTION

A dielectric porcelain composition of the present invention includes a first component and second component. If the first component is represented by the general formula of $xBaO\text{-}yNd_2O_3\text{-}zTiO_2\text{-}wBi_2O_3$; x, y, z, and w satisfy $12 \leqq x \leqq 16$, $12 \leqq y \leqq 16$, $65 \leqq z \leqq 69$, and $2 \leqq w \leqq 5$, provided that x, y, z, and w are molar ratios and x+y+z+w=100. The second component is a composition of BaO (30 to 37 wt %), $SiO_2$ (33 to 46 wt %), $La_2O_3$ (8 to 12 wt %), $Al_2O_3$ (3 to 7 wt %), SrO (0 to 1 wt %), $Li_2O$ (0 to 10 wt %), ZnO (0 to 20 wt %), and $B_2O_3$ (7 wt % or less). A compounding ratio of the second component is between 10 wt % and 30 wt % when the sum of the first and second components is 100. In addition, 0.1 to 1 wt % of $Li_2O$ and 3 to 10 wt % of ZnO, relative to 100 wt % of the sum of the first and second components, is also contained as the third component. The average particle diameter of the dielectric mixed powder forming dielectric porcelain composition before firing is 0.9 μm or less.

The use of this dielectric porcelain composition of the present invention enables the steady supply of a highly reliable and small high frequency device.

REFERENCE MARKS IN THE DRAWINGS

Figure 1:
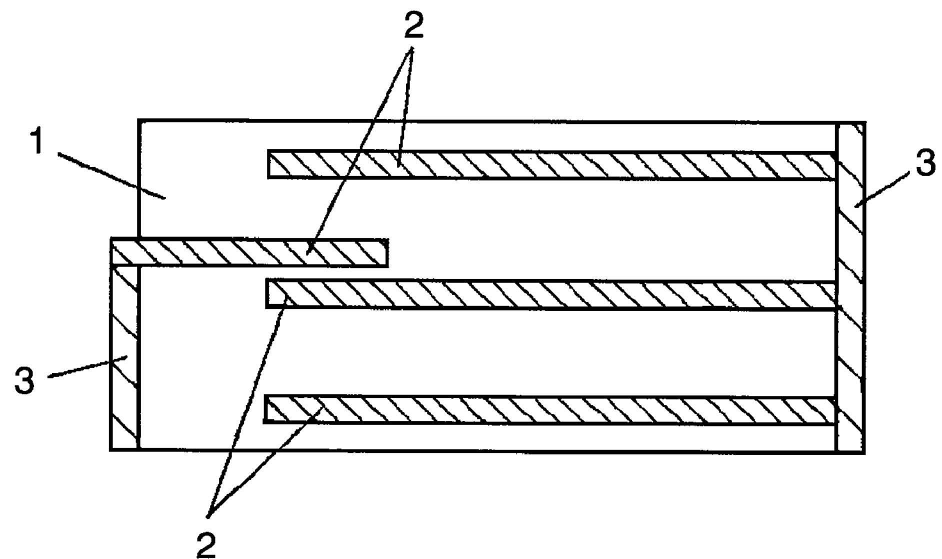
FIG. 1 is a sectional view of a high frequency device using a dielectric porcelain composition in accordance with a preferred embodiment of the present invention.

1 Laminated body
2 Internal electrode
3 External electrode
4 Space
5 Columnar grain
L Length from internal electrode end to dielectric porcelain body

DETAILED DESCRIPTION OF PREFERRED EMBODIMENTS

One objective of the present invention is to achieve a dielectric porcelain composition whose relative permittivity is 30 or more, and a high frequency device using this dielectric porcelain composition.

The dielectric porcelain composition in a preferred embodiment of the present invention is described below. Characteristics of this dielectric porcelain composition are confirmed in accordance with the following procedures.

First, a first component powder forming the dielectric porcelain composition is described. As starting materials, $BaCO_3$, $Nd_2O_3$, $TiO_2$, and $Bi_2O_3$, which are chemically highly pure (99 wt % or more), are used. After compensating their purity, they are weighed to achieve predetermined values for x, y, z, and w, respectively, in a composition of xBaO-yNd$_2$O$_3$-zTiO$_2$-wBi$_2$O$_3$ (provided that x, y, z, and w are molar ratios and x+y+z+w=100). These powdered materials and deionized water are mixed in a ball mill for 17 hours. After mixing, a slurry is dried, placed in an alumina crucible, and provisionally fired at 1000° C. to 1300° C. for two hours. After crushing the provisionally fired body, it is ground for 17 hours in the aforementioned ball mill and dried to complete the first component powder.

Next, preparation of a powder used as the second component is described. Starting materials are typically $SiO_2$, $H_3BO_3$, $Al(OH)_3$, $BaCO_3$, $CaCO_3$, $SrCO_3$, $La_2O_3$, $Li_2CO_3$, and ZnO. After compensating the purity of each material, the materials are weighed to achieve a predetermined composition. Powders of these materials are mixed using a V blender with a V-shaped mixing container. After mixing, the mixture is placed in a platinum or platinum-rhodium crucible, melted at between 1400° C. and 1600° C., and quickly cooled down using a twin roller to create glass cullet. This cullet is ground in a ball mill for eight hours and dried to complete the second component powder. Table 1 shows constituents of the mixed second component.

TABLE 1

| Composition | Constituents of the second component | | | | | | | | |
|---|---|---|---|---|---|---|---|---|---|
| | BaO | $SiO_2$ | $La_2O_3$ | $Al_2O_3$ | $B_2O_3$ | SrO | $CaCO_3$ | $Li_2O$ | ZnO |
| A | 34 | 45 | 10 | 5 | 5 | 1 | | | |
| B | 32 | 41 | 16 | 5 | 5 | 1 | | | |
| C | 36 | 44 | 6 | 5 | 8 | 1 | | | |
| D | | 40 | | 12 | 4 | | 34 | | 10 |
| E | 32 | 34 | 9 | 5 | 5 | 1 | | | 14 |
| F | 36 | 39 | 10 | 6 | 5 | 1 | | 3 | |

Powders of the first component, second component, and third component are weighed in accordance with the compounding ratios shown in Tables 2A and 2B. As shown in Tables 2A and 2B, a powder of the third component is one of powder of CuO, $B_2O_3$, $GeO_2$, $Li_2O$, and ZnO, or a mixture of one of these powders and ZnO. However, the third component is not limited to oxides. Other salts such as carbonates and nitrates may also be added. For example, $Li_2CO_3$ is applicable.

TABLE 2A

| Specimen No. | Constituents of 1st component x | y | z | w | Compounding ratio of 2nd component Type | Wt % | Compounding ratio of 3rd component Constituents | Wt % | Constituents | Wt % | Average particle diameter/µm | Firing Temperature/° C. | Firing Holding time/hr | Characteristics εr | Qf product/GH | Deflective Strength/MPa | Reactivity with Ag |
|---|---|---|---|---|---|---|---|---|---|---|---|---|---|---|---|---|---|
| 1* | 15 | 15 | 67 | 3 | A | 0 | — | — | — | — | 0.72 | Not sintered | — | — | — | — | — |
| 2* | 15 | 15 | 67 | 3 | A | 5 | — | — | — | — | 0.75 | Not sintered | — | — | — | — | — |
| 3* | 15 | 15 | 67 | 3 | A | 5 | CuO | 1.5 | — | — | 0.75 | Not sintered | — | — | — | — | — |
| 4* | 15 | 15 | 67 | 3 | A | 10 | — | — | — | — | 0.76 | Not sintered | — | — | — | — | — |
| 5* | 15 | 15 | 67 | 3 | A | 10 | CuO | 1.5 | — | — | 0.72 | 940 | 5 | 66 | 2690 | Not measured | X |
| 6* | 15 | 15 | 67 | 3 | A | 15 | CuO | 1.5 | — | — | 0.79 | 920 | 5 | 55 | 2200 | Not measured | X |
| 7* | 15 | 15 | 67 | 3 | A | 20 | — | — | — | — | 0.75 | Not sintered | — | — | — | — | — |
| 8* | 15 | 15 | 67 | 3 | A | 20 | CuO | 1.5 | — | — | 0.77 | 920 | 5 | 45 | 1900 | Not measured | X |
| 9* | 15 | 15 | 67 | 3 | A | 20 | $B_2O_3$ | 1.5 | — | — | 0.74 | 940 | 5 | 42 | 1440 | Not measured | Δ |
| 10* | 15 | 15 | 67 | 3 | A | 20 | $GeO_2$ | 1.5 | — | — | 0.78 | 940 | 5 | 44 | 1520 | Not measured | Δ |
| 11* | 15 | 15 | 67 | 3 | A | 20 | $Li_2O$ | 1.5 | — | — | 0.76 | 920 | 5 | 47 | 1170 | Not measured | ○ |
| 12* | 15 | 15 | 67 | 3 | A | 20 | ZnO | 1.5 | — | — | 0.71 | 940 | 5 | 47 | 1930 | Not measured | Δ |
| 13* | 15 | 15 | 67 | 3 | A | 15 | ZnO | 1.5 | — | — | 0.54 | 900 | 5 | 56 | 2520 | 170 | Δ |

TABLE 2A-continued

| Specimen No. | Constituents of 1st component x | v | z | w | Compounding ratio of $2^{nd}$ component Type | Wt % | Compounding ratio of $3^{rd}$ component Constituents | Wt % | Constituents | Wt % | Average particle diameter/ µm | Firing Temperature/ ° C. | Holding time/hr | Characteristics ϵr | Qf product/ GH | Deflective Strength/ MPa | Reactivity with Ag |
|---|---|---|---|---|---|---|---|---|---|---|---|---|---|---|---|---|---|
| 14* | 15 | 15 | 67 | 3 | A | 20 | $Li_2O$ | 0.1 | — | — | 0.85 | Not sintered | — | — | — | — | — |
| 15* | 15 | 15 | 67 | 3 | A | 20 | $Li_2O$ | 0.25 | — | — | 0.84 | Not sintered | — | — | — | — | — |
| 16* | 15 | 15 | 67 | 3 | A | 20 | $Li_2O$ | 0.5 | — | — | 0.80 | 920 | 5 | 49 | 1240 | Not measured | ○ |
| 17* | 15 | 15 | 67 | 3 | A | 20 | $Li_2O$ | 0.1 | ZnO | 1.0 | 0.77 | Not sintered | — | — | — | — | — |
| 18 | 15 | 15 | 67 | 3 | A | 10 | $Li_2O$ | 0.1 | ZnO | 5.0 | 0.74 | 940 | 5 | 63 | 3380 | 170 | ○ |
| 19* | 15 | 15 | 67 | 3 | A | 15 | $Li_2O$ | 0.25 | ZnO | 1.0 | 0.74 | Not sintered | — | — | — | — | — |
| 20* | 15 | 15 | 67 | 3 | A | 15 | $Li_2O$ | 0.25 | ZnO | 2.0 | 0.78 | 940 | 5 | 53 | 1710 | Not measured | ○ |
| 21 | 15 | 15 | 67 | 3 | A | 15 | $Li_2O$ | 0.25 | ZnO | 3.0 | 0.76 | 920 | 5 | 53 | 2160 | 160 | ○ |
| 22 | 15 | 15 | 67 | 3 | A | 15 | $Li_2O$ | 0.25 | ZnO | 4.0 | 0.78 | 920 | 5 | 52 | 2620 | 160 | ○ |
| 23 | 15 | 15 | 67 | 3 | A | 15 | $Li_2O$ | 0.25 | ZnO | 5.0 | 0.75 | 920 | 5 | 52 | 3170 | 170 | ○ |
| 24 | 15 | 15 | 67 | 3 | A | 15 | $Li_2O$ | 0.25 | ZnO | 9.0 | 0.75 | 920 | 5 | 47 | 3000 | 170 | ○ |
| 25 | 15 | 15 | 67 | 3 | A | 15 | $Li_2O$ | 0.25 | ZnO | 5.0 | 0.59 | 900 | 2 | 56 | 2950 | 170 | ○ |
| 26 | 15 | 15 | 67 | 3 | A | 20 | $Li_2O$ | 0.25 | ZnO | 3.0 | 0.74 | 920 | 5 | 44 | 2260 | 155 | ○ |

Specimen numbers marked * are comparison data.
Reactivity with Ag
○: No reaction,
Δ Partial reaction
X Loss

TABLE 2B

| Specimen No. | Constituents of 1st component x | y | z | w | Compounding ratio of $2^{nd}$ component Type | Wt % | Compounding ratio of $3^{rd}$ component Constituents | Wt % | Constituents | Wt % | Average particle diameter/ µm | Firing Temperature/ ° C. | Holding time/hr | Characteristics ϵr | Qf product/ GHz | Deflective Strength/ MPa | Reactivity with Ag |
|---|---|---|---|---|---|---|---|---|---|---|---|---|---|---|---|---|---|
| 27 | 15 | 15 | 67 | 3 | A | 20 | $Li_2O$ | 0.25 | ZnO | 4.0 | 0.72 | 920 | 5 | 44 | 2770 | 160 | ○ |
| 28 | 15 | 15 | 67 | 3 | A | 20 | $Li_2O$ | 0.25 | ZnO | 5.0 | 0.73 | 920 | 5 | 44 | 2930 | 160 | ○ |
| 29* | 15 | 15 | 67 | 3 | A | 20 | $Li_2O$ | 0.25 | ZnO | 5.0 | 1.10 | Not sintered | — | — | — | — | — |
| 30* | 15 | 15 | 67 | 3 | A | 15 | $Li_2O$ | 0.25 | ZnO | 12.0 | 0.74 | 950 | 5 | 46 | 3000 | 160 | ○ |
| 31* | 15 | 15 | 67 | 3 | B | 20 | CuO | 1.5 | — | — | 0.78 | 940 | 5 | 56 | 1610 | Not measured | X |
| 32* | 15 | 15 | 67 | 3 | C | 20 | $Li_2O$ | 0.25 | ZnO | 5.0 | 0.77 | 940 | 5 | 53 | 2760 | Not measured | Δ |
| 33* | 15 | 15 | 67 | 3 | D | 20 | CuO | 1.5 | — | — | 0.75 | 950 | 5 | 41 | 790 | Not measured | Not measured |
| 34 | 15 | 15 | 67 | 3 | E | 15 | $Li_2O$ | 0.25 | ZnO | 5.0 | 0.72 | 900 | 5 | 50 | 2800 | 170 | ○ |
| 35 | 15 | 15 | 67 | 3 | F | 15 | $Li_2O$ | 0.25 | ZnO | 5.0 | 0.75 | 900 | 5 | 46 | 2200 | 160 | ○ |
| 36 | 12 | 18 | 67 | 3 | A | 15 | $Li_2O$ | 0.25 | ZnO | 5.0 | 0.72 | 940 | 5 | 46 | 2710 | 160 | ○ |
| 37 | 16 | 12 | 69 | 3 | A | 15 | $Li_2O$ | 0.25 | ZnO | 5.0 | 0.78 | 940 | 5 | 45 | 2820 | 160 | ○ |
| 38 | 16 | 16 | 65 | 3 | A | 15 | $Li_2O$ | 0.25 | ZnO | 5.0 | 0.71 | 940 | 5 | 47 | 2900 | 170 | ○ |
| 39 | 15 | 15 | 68 | 2 | A | 15 | $Li_2O$ | 0.25 | ZnO | 5.0 | 0.80 | 940 | 5 | 47 | 2950 | 170 | ○ |
| 40 | 14 | 14 | 67 | 5 | A | 15 | $Li_2O$ | 0.25 | ZnO | 5.0 | 0.79 | 940 | 5 | 46 | 2830 | 170 | ○ |
| 41* | 14.5 | 14.5 | 63.5 | 7.5 | A | 15 | $Li_2O$ | 0.25 | ZnO | 5.0 | 0.80 | 900 (melted) | — | — | — | — | — |
| 42* | 8 | 22 | 67 | 3 | A | 15 | $Li_2O$ | 0.25 | ZnO | 5.0 | 0.76 | 940 | 5 | 28 | 1800 | Not measured | Not measured |

TABLE 2B-continued

| Specimen No. | Constituents of 1st component x | y | z | w | Compounding ratio of $2^{nd}$ component Type | Wt % | Compounding ratio of $3^{rd}$ component Constituents | Wt % | Constituents | Wt % | Average particle diameter/ µm | Firing Temperature/ ° C. | Firing Holding time/hr | Characteristics εr | Qf product/ GHz | Deflective Strength/ MPa | Reactivity with Ag |
|---|---|---|---|---|---|---|---|---|---|---|---|---|---|---|---|---|---|
| 43* | 22 | 8 | 67 | 3 | A | 15 | $Li_2O$ | 0.25 | ZnO | 5.0 | 0.72 | 940 | 5 | 50 | 1600 | Not measured | Not measured |
| 44* | 26 | 26 | 45 | 3 | A | 15 | $Li_2O$ | 0.25 | ZnO | 5.0 | 0.78 | 940 | 5 | 69 | 1400 | Not measured | Not measured |
| 45* | 8 | 8 | 81 | 3 | A | 15 | $Li_2O$ | 0.25 | ZnO | 5.0 | 0.78 | 940 | 5 | 43 | 1900 | Not measured | Not measured |
| 46* | 15 | 15 | 67 | 3 | A | 0 | $Li_2O$ | 0.25 | ZnO | 5.0 | 0.75 | Not sintered | — | — | — | — | — |
| 47* | 15 | 15 | 67 | 3 | A | 5 | $Li_2O$ | 0.25 | ZnO | 5.0 | 0.75 | Not sintered | — | — | — | — | — |
| 48 | 15 | 15 | 67 | 3 | A | 10 | $Li_2O$ | 0.25 | ZnO | 5.0 | 0.75 | 920 | 5 | 60 | 2900 | 170 | ○ |
| 49 | 15 | 15 | 67 | 3 | A | 25 | $Li_2O$ | 0.25 | ZnO | 5.0 | 0.75 | 900 | 5 | 39 | 2300 | 165 | ○ |
| 50 | 15 | 15 | 67 | 3 | A | 20 | $Li_2O$ | 0.25 | ZnO | 5.0 | 0.86 | 920 | 5 | 45 | 3000 | 160 | ○ |
| 51 | 15 | 15 | 67 | 3 | A | 30 | $Li_2O$ | 0.25 | ZnO | 5.0 | 0.76 | 920 | 5 | 33 | 2500 | 160 | ○ |
| 52* | 15 | 15 | 67 | 3 | A | 35 | $Li_2O$ | 0.25 | ZnO | 5.0 | 0.75 | 950 | 5 | 25 | 2300 | 150 | Δ |

Specimen numbers marked * are comparison data.
Reactivity with Ag
○: No reaction,
Δ Partial reaction
X Loss The first component, second component, and third component are mixed in the ball mill by wet blending and ground. The average particle diameter is then measured using a laser diffraction particle size analyzer. Then, polyvinyl alcohol aqueous solution (5 wt % aqueous solution) is added at 8 wt % to the ground powder as a binder. After mixing, the mixture is granulated using a 32-mesh sieve. The sieved mixture is pressed into a cylindrical shape 13 mm in diameter and about 7 mm thick under a pressure of 100 MPa. The pressed body is heated at 600° C. for two hours to burn out the binder, then fired at a temperature ranging from 900 to 960° C. on a mullite setter for two to five hours. The dielectric characteristic for microwaves of the sintered body fired at a temperature that achieves the highest density is then measured. The resonance frequency and Q value are calculated using the dielectric resonator method. Then, relative permittivity (∈r) is calculated based on the dimensions of the sintered body and the resonance frequency. Here, the resonance frequency is 3 to 7 GHz. The mechanical strength of the sintered body is measured according to JIS-R1601. Tables 2A and 2B show the measurement results. The Qf product in Tables 2A and 2B is a product of the Q value and frequency f used for measurement. The resonance frequency f is between 3 and 7 GHz, and varies depending on the size and shape of the specimen. Therefore, the Qf product, which is not affected by the size or shape of the specimen, is calculated for comparison. This is a general method used in the industry.

Next, a ceramic slurry is prepared by mixing and dispersing an organic binder, plasticizer, and organic solvent in the mixed powder of the first, second and third components. This ceramic slurry is applied to a base film such as a PET film, using a doctor blade method or die-coating method, to prepare a ceramic green sheet.

Ag paste is then screen-printed on the ceramic green sheet, forming a line 200 to 500 µm wide on a surface or inner layer of the laminated body to complete a laminated body about 1 mm thick. This laminated body is fired at a range of temperatures between 900° C. and 940° C. to confirm reactivity with Ag.

The first component is represented by Formula (1).

$$XbaO\text{-}yNd_2O_3\text{-}zTiO_2\text{-}wBi_2O_3 \quad (1),$$

whereas x, y, z, and w are molar ratios, and x+y+z+w=100.

These x, y, z, and w values are preferably within the range shown in the following Formulae (2) to (5), respectively.

$$12 \leqq x \leqq 16 \quad (2)$$

$$12 \leqq y \leqq 16 \quad (3)$$

$$65 \leqq z \leqq 69 \quad (4)$$

$$2 \leqq w \leqq 5 \quad (5)$$

As shown in specimen Nos. 41 to 45 in Table 2B, relative permittivity becomes 30 or smaller in some cases, or the Qf product becomes lower than 2000 GHz, when the second component is glass composition A, and when x, y, z, and w are not in the ranges shown by Formulae (2) to (5). In addition, the specimens do not sinter as porcelain in some cases. For the above reasons, such composition is not preferable as the dielectric porcelain composition.

When the second component contains 12 wt % or more of $La_2O_3$ shown in Table 1, such as specimen No. 31 using glass composition B, sintering performance degrades, and the Qf product also reduces. Accordingly, such composition is not preferable as the dielectric porcelain composition.

When the second component contains 8 wt % or less of $La_2O_3$ shown in Table 1, such as specimen No. 32 using glass composition C, loss of Ag is noticed due to partial reaction of Ag with porcelain. When a compounding ratio of $B_2O_3$ becomes 7 wt % or more, gelation occurs by mixing and dispersing composition, in which mixed powder, organic binder, and plasticizer are dispersed in an organic solvent. When gelation occurs, a sheet with stable film thickness and density cannot be manufactured in a subsequent sheet-forming process.

When the second component contains no $La_2O_3$ shown in Table 1, such as specimen No. 33 using glass composition D, sintering performance is not sufficient even at 950° C., and the Qf product further reduces.

On the other hand, in case of specimen Nos. 34 and 35, which uses compositions E and F containing ZnO or $Li_2O$ in glass, a softening point of glass can be lowered, improving the sintering performance of dielectric porcelain composition.

In the case of specimen Nos. 1 to 3 in which a compounding ratio of the second component is less than 10 wt %, or specimen Nos. 4 and 7 in which no third component is added, these specimens do not sinter even at 940° C., which does not fit to the objective of the present invention. Also even when $Li_2O$ or ZnO is added as the third component, it becomes difficult to ensure sintering when the compounding ratio of the second component is less than 10 wt %, which is the case of specimen Nos. 46 and 47. In the case of specimen No. 52, in which the second component is added over 30 wt %, the sintering temperature increases in addition to permittivity becoming lower than 30. Reaction with Ag also accelerates by increased addition of glass. Accordingly, such compositions are not preferable.

In the case of specimen Nos. 5, 6, and 8 which uses CuO as the third component, the firing temperature can be reduced. However, reactivity with Ag is extremely high, causing disappearance of the Ag-paste line formed on the surface or inner layer. Accordingly, such composition is not preferable for forming the device.

In the case of using only $B_2O_3$, $GeO_2$, or ZnO as the third component, as in the case of specimen Nos. 9, 10, 12, and 13, sintering temperature is not as low as the cases using CuO. The Qf product is also lower than 2000 GHz, which is not preferable.

In the case of using only $Li_2O$ as the third component, as in the case of specimen No. 11, low-temperature sintering at 920° C., same as that using CuO, is feasible. However, the Qf product is extremely low around 1000 GHz. In addition, in this case, gelation occurred at making slurry by adding a binder, plasticizer, and solvent to the powder specimen. Accordingly, steady sheet-forming is not feasible.

When a laminated sintered body shown in FIG. 1 is prepared using a material composition of specimen No. 11, and its terminal electrode is plated, the strength of the terminal electrode degrades significantly. One cause is assumed to be elution of Li component into plating solution. Accordingly, addition of $Li_2O$ is preferably as small as possible for securing sintering performance.

Specimen Nos. 14 to 16 achieve low-temperature sintering by the use of $Li_2O$, but an additive amount of $Li_2O$ is reduced to reduce an effect on the Qf product. However, sintering is not feasible when 0.1 wt % or 0.25 wt % is added, and thus 0.5 wt % is needed. However, even when 0.5 wt % is added, the Qf product is not so different from that of specimen No. 11 to which 1.5 wt % is added. Accordingly, no significant improvement is noticed.

Then, in addition to $Li_2O$, improvement is attempted by adding ZnO which demonstrates the highest Qf product in the third component used in specimen Nos. 8 to 12. As a result, sintering performance is secured and higher Qf product is achieved by adding 3 to 10 wt % of ZnO when a glass additive amount of the second component is within the range of the present invention, as shown in specimen Nos. 17 to 28.

However, sintering performance is not secured in specimen Nos. 17 and 19 and the Qf product is low in specimen No. 20, to which ZnO is added less than 3.

Table 3 shows the relation of constituents of dielectric porcelain composition, slurry viscosity, and the strength of terminal electrode after firing.

TABLE 3

| Specimen No. | Constituents of the first component x | y | z | w | Compounding ratio of the second component Type | Wt % | Compounding ratio of the third component Composition | Wt % | Composition | Wt % | Average particle diameter μm | Slurry viscosity Pa's (1/s) | Terminal electrode strength N/mm |
|---|---|---|---|---|---|---|---|---|---|---|---|---|---|
| 11 * | 15 | 15 | 67 | 3 | A | 20 | $Li_2O$ | 1.5 | — | — | 0.76 | Gelation | — |
| 51 | 15 | 15 | 67 | 3 | A | 20 | $Li_2O$ | 0.1 | ZnO | 5.0 | 0.74 | 1~3 | 4 |
| 28 | 15 | 15 | 67 | 3 | A | 20 | $Li_2O$ | 0.25 | ZnO | 5.0 | 0.73 | 1~3 | 4 |
| 52 | 15 | 15 | 67 | 3 | A | 20 | $Li_2O$ | 0.4 | ZnO | 5.0 | 0.75 | 1~3 | 4 |
| 53 | 15 | 15 | 67 | 3 | A | 20 | $Li_2O$ | 0.6 | ZnO | 5.0 | 0.75 | 1~3 | 4 |
| 54 | 15 | 15 | 67 | 3 | A | 20 | $Li_2O$ | 0.7 | ZnO | 5.0 | 0.75 | 5 | 3 |
| 55 | 15 | 15 | 67 | 3 | A | 20 | $Li_2O$ | 1 | ZnO | 5.0 | 0.75 | >10 | 1.5 |
| 56 * | 15 | 15 | 67 | 3 | A | 20 | $Li_2O$ | 1.5 | ZnO | 5.0 | 0.75 | Gelation | — |

As shown in Table 3, partial gelation occurs when preparing slurry, same as in specimen No. 11, in specimen Nos. 54 to 56 if the additive amount of $Li_2O$ exceeds 0.6 wt % in spite of $Li_2O$ and ZnO being added as the third component. This increases the viscosity of the slurry. In particular, specimen No. 56 is completely gelated. Accordingly, sheet forming is not absolutely impossible, but it is difficult to form sheets reliably for mass production using specimen Nos. 54 and 55. When a laminated sintered body is prepared using these specimens and the terminal electrodes are plated, the strength of the terminal electrodes degrades. From the above reasons, $Li_2O$ is added at between 0.1 and 1.0 parts by weight, and preferably between 0.1 and 0.6 wt %.

If ZnO is added at over 10 wt %, as in the case of specimen No. 30, the sintering performance significantly degrades, although there is no problem with the characteristics of permittivity and Q value. In other words, specimen No. 30 needs to be heated at a high temperature exceeding 950° C., which is not preferable, to obtain a dense sintered body.

If average particle diameter is 0.9 μm or smaller, such as in specimen Nos. 28 and 50, sintering performance is secured. However, if the diameter is larger than 0.9 μm, as in specimen No. 29, the composition does not sinter.

On the other hand, if the average particle diameter is reduced to 0.6 μm or smaller by grinding, as in specimen No. 25, sintering at even lower temperatures becomes feasible, and thus it is preferable since it permits more rapid sintering. However, although sintering at 900° C. is secured even if only ZnO is added as the third component, as in specimen No. 13, by making the particle diameter 0.6 μm or smaller as described above, the test reveals that a part of Ag and porcelain react, which is not preferable. Specimen No. 25 contains $Li_2O$, and thus it can be assumed that the presence of $Li_2O$ has the effect of suppressing the reaction between the Ba—Nd—Ti—Bi—O body and Ag.

Conditions for the dielectric porcelain composition of the present invention are described below.

(First condition) When the first component is represented by the following general Formula (1), the aforementioned x, y, z, and w are within the ranges in Formulae (2) to (5), respectively.

$$\text{XbaO-yNd}_2\text{O}_3\text{-zTiO}_2\text{-wBi}_2\text{O}_3 \quad (1)$$

Here, x, y, z, and w are molar ratios, and x+y+z+w=100.

$$12 \leqq x \leqq 16 \quad (2)$$

$$12 \leqq y \leqq 16 \quad (3)$$

$$65 \leqq z \leqq 69 \quad (4)$$

$$2 \leqq w \leqq 5 \quad (5)$$

(Second condition) The second component is a glass containing the following compounds in the compounding ratios in parentheses. More specifically, these are BaO (30 to 37 wt %), $SiO_2$ (33 to 46 wt %), $La_2O_3$ (8 to 12 wt %), $Al_2O_3$ (3 to 7 wt %), SrO (0 to 1 wt %), $Li_2O$ (0 to 10 wt %), ZnO (0 to 20 wt %), and $B_2O_3$ (7 wt % max.).

(Third condition) When the sum of the first component and second component is 100, the compounding ratio of the second component is between 10 wt % and 30 wt %.

(Fourth condition) When the sum of the first component and second component is 100 parts by weight, the third component is 0.1 to 1 parts by weight of $Li_2O$ and 3 to 10 parts by weight of ZnO.

(Fifth condition) Dielectric mixed powder forming the dielectric porcelain composition before firing has the average particle diameter of 0.9 μm or smaller.

The dielectric porcelain compositions in specimen Nos. 18, 21 to 28, 34 to 40, and 48 to 51 satisfy all the above first to fifth conditions, and thus the compositions in these specimens are included in the present invention. All these specimens can be sintered at 940° C. or lower, and show good microwave dielectric characteristics including relative permittivity (∈r) of 30 or more and the Qf product of 2000 GHz or higher. In addition, low reactivity with Ag is confirmed. Still more, a mechanical strength is 155 Mpa or higher in all these specimens, which is higher than 140 MPa, a deflective strength of conventional $Bi_2O_3$—CaO—$Nb_2O_5$ porcelain.

Table 4 shows the percentage of columnar grain on the surface of the sintered body, the long axis/short axis ratio of the columnar grain, the deflective strength of the sintered body, and the reactivity of the Ag electrode and the body.

TABLE 4

| NO. | Percentage of columnar grain % | Long axis/short axis ratio of columnar grain | Deflective strength MPa | Reactivity with Ag |
|---|---|---|---|---|
| a | <10 | <15 | 170 | ○ |
| b | 30 | <20 | 165 | ○ |
| c | 50 | ≦25 | 160 | ○ |
| d | 60 | ≦25 | 155 | ○ |
| e* | 75 | >25 | 130 | Δ |

Figure 4:
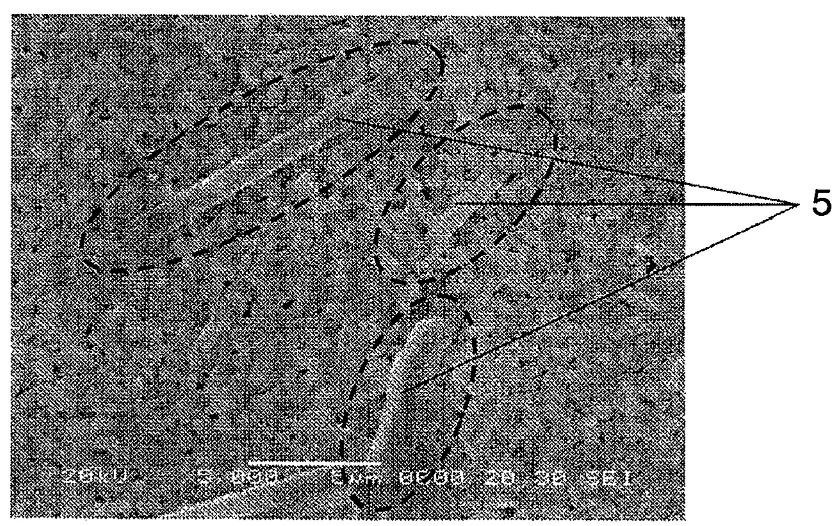
FIG. 4 is a magnified view illustrating a surface of sintered dielectric porcelain composition in accordance with the preferred embodiment of the present invention.

FIG. 4 illustrates the state of the surface of the sintered body observed using a scanning electron microscope (SEM). An example of columnar grain 5 can be observed in the area marked with a dotted line in FIG. 4. The deposition percentage of columnar grain and its long axis/short axis ratio are controllable by changing conditions such as firing conditions, starting particle diameter, and ground particle diameter.

As shown in No. e in Table 4, the deflective strength falls to 140 MPa or lower if the percentage of columnar grain exceeds 60% of the entire surface. This reduces the advantage of mechanical strength compared to that of $Bi_2O_3$—CaO—$Nb_2O_5$ porcelain, and also increases the trend for reactive loss of the electrode due to higher reactivity with the Ag electrode. Specimen numbers marked * in Tables 2A, 2B, 3, and 4 are specimens for comparison. In Tables 2A, 2B, and 4, reactivity with Ag is indicated by O (no reaction), Δ (partial reaction), and X (electrode loss due to reaction).

A larger long axis/short axis ratio of columnar grain, i.e., a so-called larger growth of columnar grain, reduces the deflective strength to 140 MPa or lower, which is not preferable as the dielectric porcelain composition. In addition, if the long axis/short axis ratio rises, reactivity with Ag increases when the composition is simultaneously fired with Ag for manufacturing devices. This results in a greater degree of loss at the electrode end. Accordingly, this is also not preferable, taking into account the need for firing in the presence of Ag.

As described above, the percentage of columnar grain is preferably 60% or lower relative to the entire surface, and the long axis/short axis ratio of columnar grain is preferably between 1 and 25.

Figure 2:
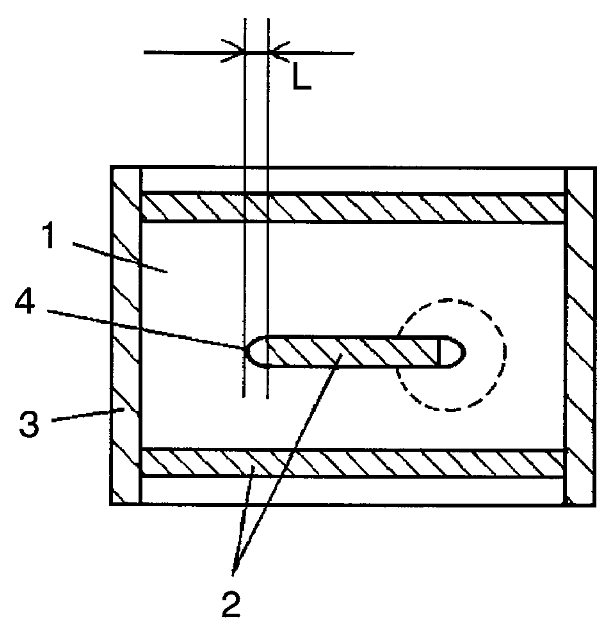
FIG. 2 is a sectional view the high frequency device using the dielectric porcelain composition in accordance with the preferred embodiment of the present invention.

A high frequency device shown in FIGS. 1 and 2 is a laminated resonator including inner-layer electrode 2 forming a high frequency circuit configured with a strip line and capacitor in the inner layer of laminated body 1 made using the aforementioned dielectric porcelain composition. The dimensions of the high frequency device are, for example, 8 mm long, 5 mm wide, and 0.9 mm high. This structure demonstrates a high resonance characteristic.

Figure 3:
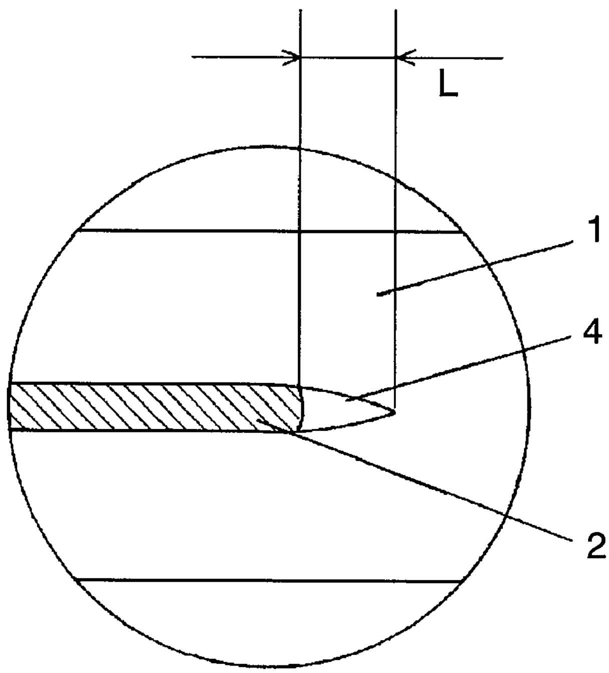
FIG. 3 is a sectional view of around an electrode end of the high frequency device using the dielectric porcelain composition in accordance with the preferred embodiment of the present invention.

FIG. 2 is a sectional view of a high frequency device using the dielectric composition in the preferred embodiment of the present invention. FIG. 3 is a magnified view of around the electrode end.

This device is characterized by its length L, between the internal electrode end and dielectric porcelain body, being 15 μm or less. This space 4 is a phenomenon often noticed in the internal electrodes of laminated ceramics for reasons that include reaction between Ag and the ceramic body and attraction of the electrode by firing shrinkage. Since length L is 15 μm or less, the electric field becomes concentrated on the electrode end, and thus conductor loss is large at the end. This prevents degradation of the Q value of the resonator. The relation between length L, which shows the size of the space, and the Q value of the resonator is shown in Table 5.

TABLE 5

| L (μm) | Q value |
|---|---|
| 0 | 135 |
| 5 | 132 |
| 10 | 130 |
| 15 | 128 |
| 20 | 105 |
| 30 | 96 |

As shown in Table 5, the Q value of the resonator remains almost constant if the length L is 15 μm or less. On the other hand, if length L exceeds 15 μm, the Q value of resonator drops significantly, as shown in Table 5, due to the smaller electrode width, which is not preferable.

As described above, the dielectric porcelain composition can be sintered at a temperature that allows simultaneous firing with Ag, has low reactivity with Ag electrode; and has high relative permittivity, Q value and mechanical strength. A small high frequency device with high performance and high mechanical strength can be offered by using this dielectric porcelain composition for the laminated body forming the high frequency device shown in FIG. 1.

INDUSTRIAL APPLICABILITY

The dielectric porcelain composition of the present invention can be sintered at a low temperature of around 900° C., has low reactivity with Ag, and high relative permittivity and Q value. In addition, a slurry can be reliably prepared. The dielectric porcelain composition also shows high plating resistance. The high frequency device used in a high frequency range can thus be offered by employing the dielectric porcelain composition of the present invention.

The invention claimed is:

1. A dielectric porcelain composition comprising:

a first component represented by a formula of $xBaO\text{-}yNd_2O_3\text{-}zTiO_2\text{-}wBi_2O_3$; x, y, z, and w satisfying $12 \leqq x \leqq 16$, $12 \leqq y \leqq 16$, $65 \leqq z \leqq 69$, and $2 \leqq w \leqq 5$, provided that x, y, z, and w are molar ratios and $x+y+z+w=100$;

a second component including, in weight ratio, 30 to 37 wt % of BaO, 33 to 46 wt % of $SiO_2$, 8 to 12 wt % of $La_2O_3$, 3 to 7 wt % of $Al_2O_3$, 0 to 1 wt % of SrO, 0 to 10 wt % of $Li_2O$, 0 to 20 wt % of ZnO, and 7 wt % or less of $B_2O_3$, a compounding ratio of the second component being 10 wt % to 30 wt % when a sum of the first component and the second component is 100; and a third component including 0.1 to 1 parts by weight of $Li_2O$ and 3 to 10 parts by weight of ZnO, relative to 100 parts by weight of the sum of the first component and the second component;

wherein an average particle diameter of a dielectric mixed powder before firing is not greater than 0.9 μm, the dielectric mixed powder including a first powder component comprising the first component, a second powder component comprising the second component, and a third powder component comprising the third component; and the dielectric porcelain composition is a sintered body made by firing the dielectric mixed powder.

2. The dielectric porcelain composition of claim 1, wherein the sintered body has a columnar grain on a part of its surface, and a percentage of the columnar grain is not greater than 60% of an entire surface.

3. The dielectric porcelain composition of claim 2, wherein the sintered body has the columnar grain in a part of a fine structure of its surface, and a ratio of a long axis to a short axis of the columnar grain is $1 \leqq$(Long axis/short axis)$\leqq 25$.

4. A high frequency device comprising:

a laminated body including a dielectric porcelain composition; and an internal electrode forming a predetermined high frequency circuit in an inner layer of the laminated body;

wherein the dielectric porcelain composition includes a first component, a second component, and a third component, the first component being represented by a formula of $xBaO\text{-}yNd_2O_3\text{-}zTiO_2\text{-}wBi_2O_3$; x, y, z, and w satisfying $12 \leqq x \leqq 16$, $12 \leqq y \leqq 16$, $65 \leqq z \leqq 69$, and $2 \leqq w \leqq 5$, provided that x, y, z, and w are molar ratios and $x+y+z+w=100$;

the second component including, in weight ratio, 30 to 37 wt % of BaO, 33 to 46 Wt % of $SiO_2$, 8 to 12 wt % of $La_2O_3$, 3 to 7 wt % of $Al_2O_3$, 0 to 1 wt % of SrO, 0 to 10 wt % of $Li_2O$, 0 to 20 wt % of ZnO, and 7 wt % or less of $B_2O_3$, a compounding ratio of the second component being 10 wt % to 30 wt % when a sum of the first component and the second component is 100; and the third component including 0.1 to 1 parts by weight of $Li_2O$ and 3 to 10 parts by weight of ZnO, relative to 100 parts by weight of a sum of the first component and the second component;

wherein an average particle diameter of a dielectric mixed powder before firing is not greater than 0.9 μm, the dielectric mixed powder including a first powder component comprising the first component, a second powder component comprising the second component and a third powder component comprising the third component; and the dielectric porcelain composition is a sintered body made by firing the dielectric mixed powder.

5. The high frequency device of claim 4, wherein the sintered body has a columnar grain on a part of its surface, and a percentage of the columnar grain is not greater than 60% of an entire surface.

6. The high frequency device of claim 5, wherein the sintered body has the columnar grain in a part of a fine structure of its surface, and a ratio of a long axis to a short axis of the columnar grain is $1 \leqq$(Long axis/short axis)$\leqq 25$.

7. The high frequency device of claim 4, the high frequency device comprising:

the laminated body made of the dielectric porcelain composition; and the internal electrode forming the predetermined high frequency circuit in the inner layer of the laminated body;

wherein the high frequency device has a space between an end of the internal electrode and a body of the dielectric porcelain, a length of the space being not longer than 15 μm.

8. A dielectric porcelain composition made of a sintered body, the sintered body comprising:

a first component being represented by a formula of $xBaO\text{-}yNd_2O_3\text{-}zTiO_2\text{-}wBi_2O_3$; x, y, z, and w satisfying $12 \leqq x \leqq 16$, $12 \leqq y \leqq 16$, $65 \leqq z \leqq 69$, and $2 \leqq w \leqq 5$, provided that x, y, z, and w are molar ratios and x+y+z+w=100;

a second component including, in weight comparison, 30 to 37 wt % of BaO, 33 to 46 wt % of $SiO_2$, 8 to 12 wt % of $La_2O_3$, 3 to 7 wt % of $Al_2O_3$, 0 to 1 wt % of SrO, 0 to 10 wt % of $Li_2O$, 0 to 20 wt % of ZnO, and 7 wt % or less of $B_2O_3$, a compounding ratio of the second component being 10 wt % to 30 wt % when a sum of the first component and the second component is 100; and a third component including 0.1 to 1 parts by weight of $Li_2O$ and 3 to 10 parts by weight of ZnO, relative to 100 parts by weight of a sum of the first component and the second component;

wherein the sintered body has a columnar grain on a part of its surface, and a percentage of the columnar grain is not greater than 60% of an entire surface.

9. The dielectric porcelain composition of claim 8, wherein the sintered body has the columnar grain in a part of a fine structure of its surface, and a ratio of a long axis to a short axis of the columnar grain is $1 \leqq$(Long axis/short axis)$\leqq 25$.

10. The high frequency device of claim 5, the high frequency device comprising:

the laminated body made of the dielectric porcelain composition; and the internal electrode forming the predetermined high frequency circuit in the inner layer of the laminated body;

wherein the high frequency device has a space between an end of the internal electrode and a body of the dielectric porcelain, a length of the space being not longer than 15 μm.

11. The high frequency device of claim 6, the high frequency device comprising:

the laminated body made of the dielectric porcelain composition; and the internal electrode forming the predetermined high frequency circuit in the inner layer of the laminated body;

wherein the high frequency device has a space between an end of the internal electrode and a body of the dielectric porcelain, a length of the space being not longer than 15 μm.

* * * * *